US005325079A

United States Patent [19]

Aharonian

[11] Patent Number: 5,325,079

[45] Date of Patent: Jun. 28, 1994

[54] ELECTROMAGNETIC RELAY WITH INTEGRAL CONTACTS

[75] Inventor: Hrair N. Aharonian, Southfield, Mich.

[73] Assignee: Kaloust P. Sogoian, Southfield, Mich.

[21] Appl. No.: 52,087

[22] Filed: Apr. 22, 1993

Related U.S. Application Data

[63] Continuation-in-part of Ser. No. 6,632, Jan. 21, 1993.

[51] Int. Cl.[5] .......... H01M 51/22

[52] U.S. Cl. .......... 335/78; 335/80; 335/83

[58] Field of Search .......... 335/78-86, 335/124, 128

[56] References Cited

U.S. PATENT DOCUMENTS

| | | | |
|---|---|---|---|
| 3,889,087 | 6/1975 | Graeff | 200/246 |
| 3,889,098 | 6/1975 | Steinmetz et al. | 200/268 |
| 3,889,216 | 6/1975 | Hammell | 335/106 |
| 3,974,468 | 8/1976 | Ygfors | 335/151 |
| 4,517,537 | 5/1985 | Weiser et al. | 335/187 |
| 4,571,566 | 2/1986 | Saur | 335/78 |

*Primary Examiner*—Lincoln Donovan
*Attorney, Agent, or Firm*—Reising, Ethington, Barnard, Perry & Milton

[57] ABSTRACT

An electromagnetic relay having contacts formed as integral parts of the core and armature of the relay. The contacts are formed by electroplating or cladding ferromagnetic core and armature parts with low resistance material such as copper, silver, gold or platinum.

6 Claims, 2 Drawing Sheets

ELECTROMAGNETIC RELAY WITH INTEGRAL CONTACTS

CROSS REFERENCE TO RELATED APPLICATIONS

This application is a continuation in part of prior application entitled Electromagnet for Relays and Contactor Assemblies, Ser. No. 08/006,632 filed Jan. 21, 1993.

TECHNICAL FIELD

The present invention relates to electromagnetic relays and more particularly to electromagnetic relays having relatively moveable core and armature members.

BACKGROUND ART

Electromagnetic relays are widely used in electrical circuits to control the operation of many electrical and mechanical devices. Briefly, electromagnetic relays generally include a coil which is energized to move an armature relative to a core. Movement of the armature causes spring contacts attached to the armature to move causing the contacts to open or close depending upon their orientation. The armature and core are separate and distinct parts of the relay from the contacts.

Examples of prior art relays are disclosed in U.S. Pat. No. 3,889,087 which discloses a relay having pins and leads which are fashioned from a single sheet of flat stock by stamping and forming to reduce the cost of the relay. The relay also includes a core and pole pieces which are energized to move an armature and actuator to cause the pins and leads to open and close. Another example of an electromagnetic relay assembly is disclosed in U.S. Pat. No. 3,889,216 wherein a core is energized to move an armature which causes arms to engage contacts which are again formed from a single sheet. Another example of an electromagnetic relay is disclosed in U.S. Pat. No. 4,517,537 in which a flat coil is secured to a pole piece which is used to attract an armature. A plurality of flat, spring-like contacts are mechanically fastened to the armature and engage stationary contacts on the core support member when the coil is energized to attract the armature in contact with the pole pieces.

In a specialized form of a relay known as a reed relay, switch elements are repulsed or attracted depending upon a magnetic field induced by a coil which is formed about a spring-like contact elements. Examples of reed relays are disclosed in U.S. Pat. Nos. 3,974,468 and 3,889,098. In each of these disclosures, there are magnetic portions of the contact carriers provided by plating or otherwise providing a layer of ferromagnetic material on a non-ferromagnetic substrate. Such reed switches are specialized devices having limited application.

Reed switches in electromagnetic relays such as those provided above are relatively expensive to manufacture and may incorporate the use of costly raw materials and manufacturing process.

Generally, the size of the contact is very small which causes charges to be concentrated and results in arcing as the contacts are open and closed.

The present invention is directed to solving one or more of the above problems and other problems, as will be understood in view of the following description of the invention. The basic nature of this invention will suggest a multitude of potential applications wherein the advantages of the invention relating to low cost and simple manufacturing techniques can be used.

DISCLOSURE OF THE INVENTION

The present invention relates to an electromagnetic relay which includes a ferromagnetic core member having a coil. A first electrically conductive region is provided on the core which has a lower electrical resistance than the ferromagnetic material of the core member. The relay also includes a ferromagnetic armature member with a second electrically conductive region on the armature having a lower electrical resistance than the ferromagnetic member of the armature member. The core member and armature member are relatively moveable to each other between an open position wherein the first and second electrically conductive regions are separated and a closed position wherein the first and second electrically conductive regions are in contact with each other.

According to one aspect of the invention, the electromagnetic relay comprises a ferromagnetic core member including a coil disposed thereon and a first electrical contact integrally formed on the core member. The ferromagnetic armature member includes a second electrical contact integrally formed on the armature. The second electrical contact on the armature is oriented relative to the first electrical contact on the core member so that movement of the ferromagnetic armature member relative to the ferromagnetic core member opens and closes an electrical circuit, including the first and second contacts.

According to another aspect of the invention, the first and second electrical conducting regions or electrical contacts may be formed of copper, silver, gold or any other material having high electrical conductivity.

According to another aspect of the invention, the core member preferably includes two planar pole pieces on opposite sides of a central coil support portion. The armature preferably has a planar surface which is disposed parallel to the pole pieces. The side of the two co-planar pole pieces facing the armature and the side of the armature facing the two co-planar pole pieces are preferably plated with the highly electrically conductive metal. Alternatively, the core and armature could be formed of a ferromagnetic material clad to an electrically conductive material such as copper, silver or the like. First and second terminals are preferably secured to the core and armature and are electrically connected to the first and second electrically conductive regions.

According to a different aspect of the invention, the electrically conductive regions can be formed by spot plating, wherein the region is not entirely continuous across the width of the abutting portions of the core and armature member, which are moved relative to one another to open and close electrical circuit controlled by the electromagnetic relay.

According to one method of the invention, an electromagnetic relay is made by forming a core which is, in part, plated with an electrically conductive material having a greater electrically conductive fatigue than the ferromagnetic material which forms the core. The coil is assembled to the core to provide a source of electromagnetic energy. An armature is formed and plated according to the invention with an electrically conductive material. The core and armature are assembled to a base with the armature being moveable relative to the core. Means are provided for biasing the armature into a first position when the coil is de-energized. The biasing means is opposed by energizing the coil to move the armature to a second position. The plated portions of the core and armature form a pair of contacts of the relay.

According to another method of making an electromagnetic relay in accordance with the invention, a core can be formed of a ferromagnetic material having an electrically conductive material, such as copper, silver, gold, platinum or other material, as an integral portion thereof. A coil is assembled to the core. An armature is formed of a clad material such as that described above with regard to the core. The core and armature are assembled to a base with the armature being moveable relative to the core. Means are provided for biasing the armature into a first position when the coil is de-energized. The biasing means is opposed by energizing the coil to move the armature to a second position. The clad portions of the core and armature form a pair of contacts of the relay.

Additional advantages and features of the invention will be better understood upon review of the attached drawings in light of the following detailed description of the best mode for practicing the invention.

BEST MODE FOR CARRYING OUT THE INVENTION

Figure 1:
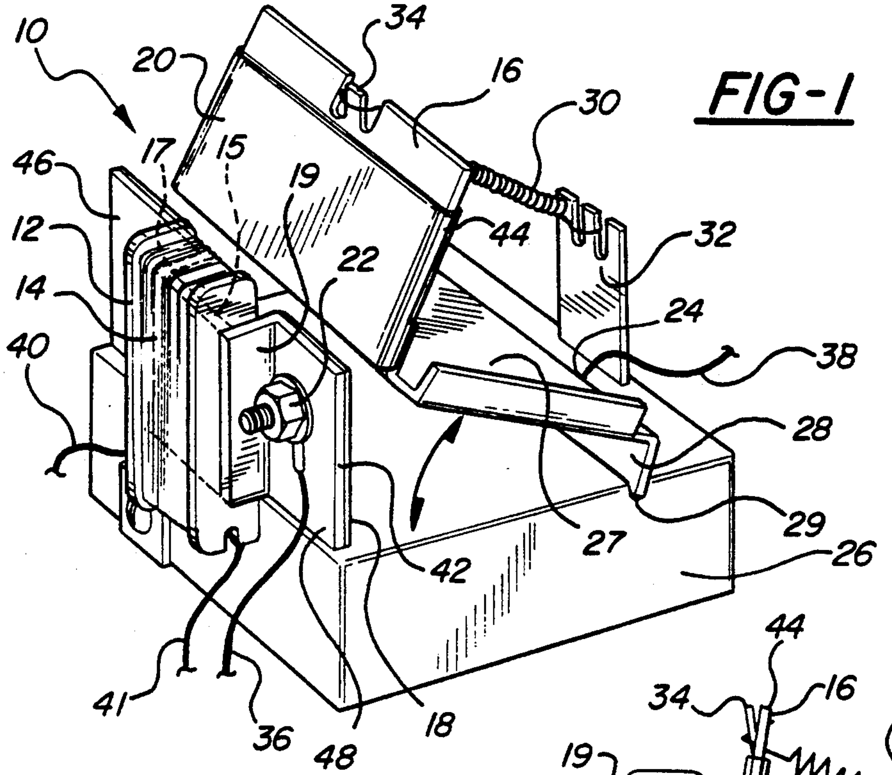
FIG. 1 is a perspective view of an electromagnetic relay made in accordance with the present invention.
Figure 2:
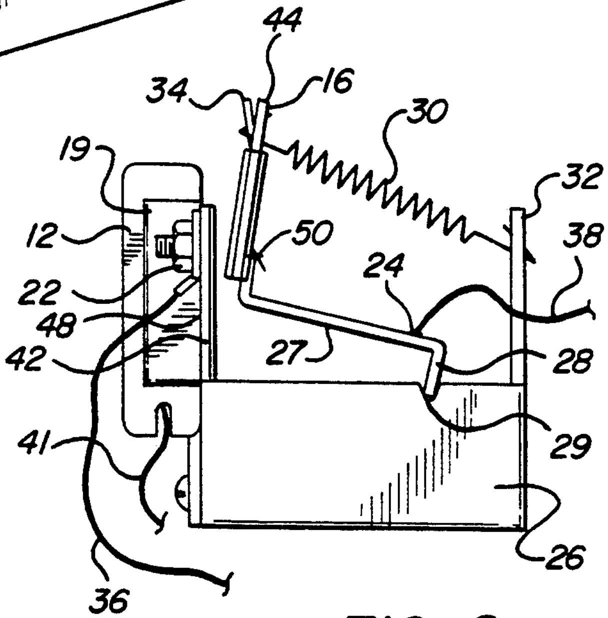
FIG. 2 is a side elevation view thereof showing the relay in its open position.
Figure 3:
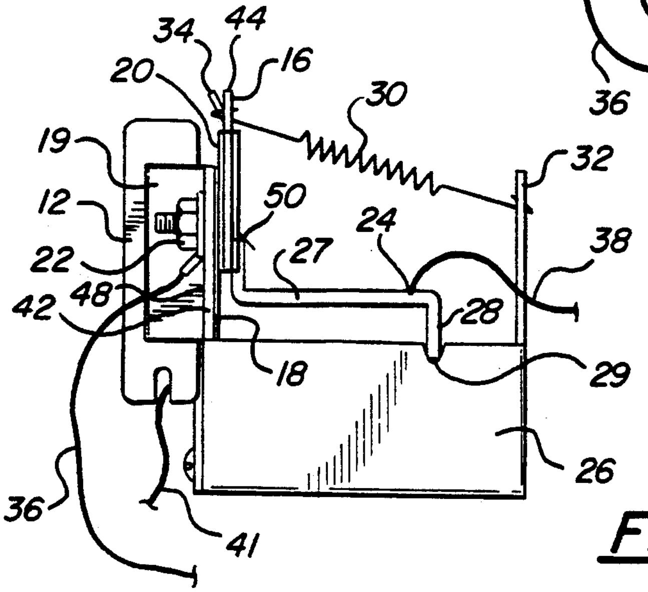
FIG. 3 is a side elevation view thereof showing the relay in its closed position.

Referring now to FIGS. 1–3, an electromagnetic relay 10 made in accordance with the present invention is shown. The electromagnetic relay 10 includes a core 12 having a coil 14 which, when energized, creates magnetic flux in the core 12. As may be seen in the Figures, the core 12 includes two sidewalls 17,19 extending perpendicularly out from a core base 15. The pole pieces 46,48 (discussed subsequently) extend outwardly from the two sidewalls 17,19 parallel to the core base 15. An armature 16 is retained for movement relative to the core 12 upon energization and de-energization of the coil 14. Core 12 and armature 16 are formed of ferromagnetic material, preferably steel or any other well-known ferromagnetic material.

First and second electrically conductive surfaces 18 and 20 are provided on the core 12 and armature 16 respectively. First and second electrically conductive surfaces 18 and 20 are formed of a material which is a good conductor of electricity, such as copper, silver, gold, platinum or the like. The electrically conductive material is one which has a lower resistance to electrical current than the ferromagnetic portions of the core 12 and armature 16.

First and second electrically conductive surfaces 18 and 20 are the switch contacts for the electromagnetic relay 10 and function as shown in FIGS. 2 and 3 by moving between the open position shown in FIG. 2 and the closed position shown in FIG. 3. In FIG. 2, the first and second electrically conductive surfaces are separated by an air gap. In FIG. 3, the first and second electrically conductive surfaces 18 and 20 are in contact with each other and allow the passage of electrical current from one to the other when the relay 10 is installed in the electrical circuit.

First and second terminals 22 and 24 are provided to connect the relay 10 to an electrical circuit. The relay may be used in power transmission, industrial controls, automotive applications, or any other application where electromagnetic relays are used.

Figure 5:
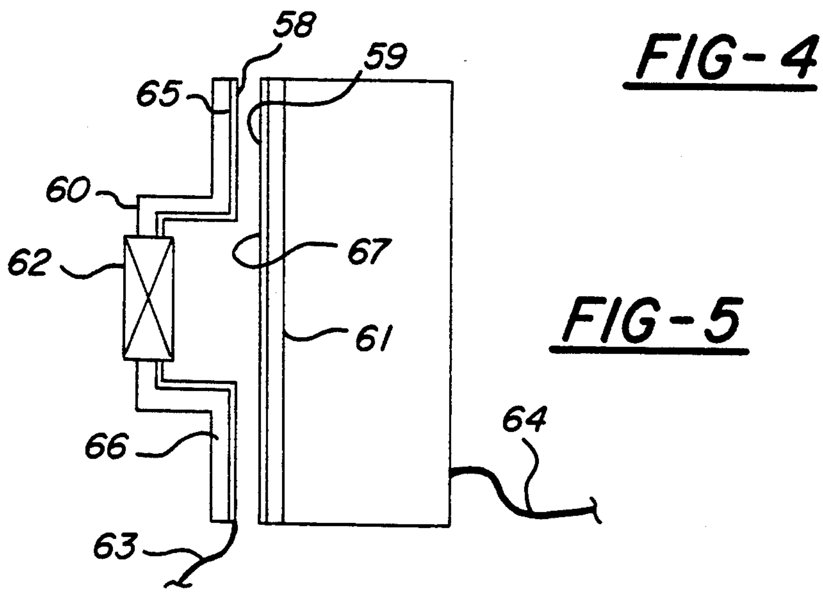
FIG. 5 is a plan view for a core and armature for an alternative embodiment of an electromagnetic relay made in accordance with the present invention.

First and second electrically conductive surfaces 18 and 19 may be formed by plating the ferromagnetic material of the core 12 and armature 16. Alternatively, as shown in FIG. 5, the core 12 and armature 16 may be formed of a ferromagnetic material which is clad with copper or another electrically conductive material to form the electrically conductive surfaces 18, 20. The core 12 and armature 16 may be plated on one side, or on part of one side, or over the entire body of the core 12 and armature 16.

Base 26 is shown as a simple block of insulation material, i.e., electrically non-conductive, which supports the core 12 in a stationary relationship relative to the armature 16. Armature 16 is carried by spacing means 27. More specifically, the spacing means includes an armature support 27 which extends perpendicularly away from the contacting plate 20. The armature support 27 includes at the opposite from the armature 27 pivot means 28 for pivoting the armature 16 about an axis. The pivot means 28 includes a fulcrum leg 28 which is received in a slot 29 from base 26. The fulcum leg 28 may be formed of an electrically conductive material such as beryllium copper or may be formed of steel having a plated or clad electrically conductive surface so that electricity may be conducted from the second terminal 24 to the second conductive surface 20 with minimal resistance. Likewise, the core 12 may be formed of a ferromagnetic material having a copper cladding or an electrically conductive plating so that electric current might be passed from the first terminal 22 to the first conductive surface 18 with minimal resistance.

Base 26 is a block of plastic or other insulation material. The structure and shape of the base 26 is expected to be modified considerably depending upon the application in which relay 10 is to be incorporated. Spring 30 is used to bias the electromagnetic relay to a normally open position as shown in FIG. 2. Spring 10 is secured on one end to an anchor 32 which is stationarily mounted on the base 26. The other end of the spring 30 is secured to a stake 34 formed on the armature 16. First and second wires 36 and 38 are secured to first and second terminals 22 and 24 respectively and are incorporated in an electrical circuit requiring an electromagnetic relay. Coil wires 40 and 41 receive electrical current from a circuit which is used to control the operation of the relay 10. Upon energization through the passage of current through coil wires 40 and 41 the ferromagnetic core 42 of the core 12 conducts magnetic flux which is used to attract the ferromagnetic armature 44 of the armature 16 to draw the armature 16 into contact with the core 12. A ferromagnetic core 42 includes first and second pole pieces 46 and 48 which extend from opposite ends of the coil 14. First and second pole pieces 46 and 48 preferably include broad co-planar surfaces which bear the first electrically conductive surface 18. First and second pole pieces are contacted simultaneous by the second conductive surface 20 formed on the armature 16. As may be seen in FIG. 3, the conductive contacting surface 20 and the first 46 and second 48 pole pieces or flanges abut each other in parallel fashion when the armature 16 is in the closed position. An important advantage of the invention is that the broad contact region of the first conductive surface 18 and second conductive surface 20 assure high current carrying capacity while minimizing arcing therebetween.

As shown in FIGS. 2 and 3, the armature support 27 which is formed of beryllium copper is soldered to the armature 16 for mechanical support and to provide a good electrical connection. Other methods of assembling the armature support to the armature 16 are also feasible. Alternatively, the armature support 27 and armature 16 may be formed from a single piece of sheet metal or clad steel.

Figure 4:
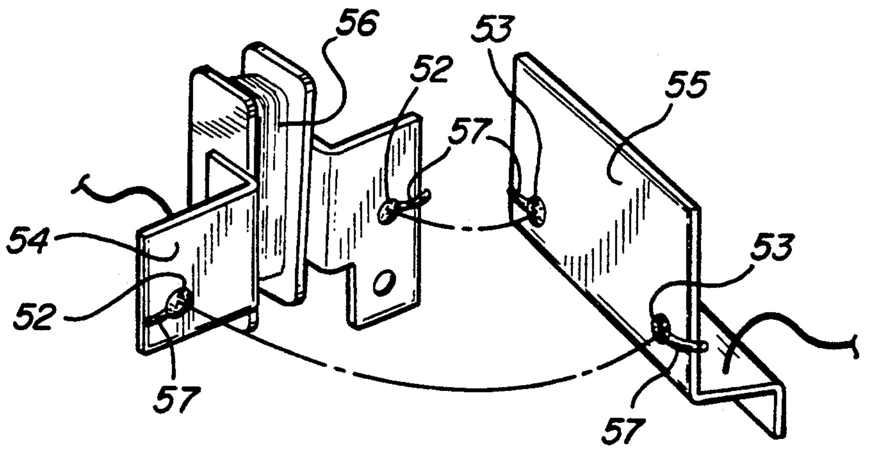
FIG. 4 is a perspective view of a core and armature for an alternative embodiment of an electromagnetic relay made in accordance with the present invention.

Referring now to FIG. 4, the first and second contact points 52 and 53 may be formed by partially plating the core 54 and armature 55 in corresponding locations so that contact is made when the armature 55 contacts the core 54 as a result of energization of a coil 56 located on the core 54. Leads 57 extend from the contact points 52, 53 to complete the circuit from the contact points 52, 53 to wires.

Referring now to FIG. 5, an alternative embodiment of the invention is shown wherein first and second copper cladding 58 and 59 are provided on the core 60 and on armature 61 respectively. A core 62 is provided on the core 60 to cause the armature 61 to move upon energization of the core 62. First and second wires 63 and 64 are electrically connected to the first and second copper cladding 58, 59 by soldering or terminal connectors, as will be known in the art. First and second pole pieces 65, 66 present the copper cladding 58 of the core 60 for contact with a parallel surface 67 on the armature 61. The surface 67 is covered by copper cladding 59 and is adapted to contact first and second pole pieces 65, 66.

Figure 6:
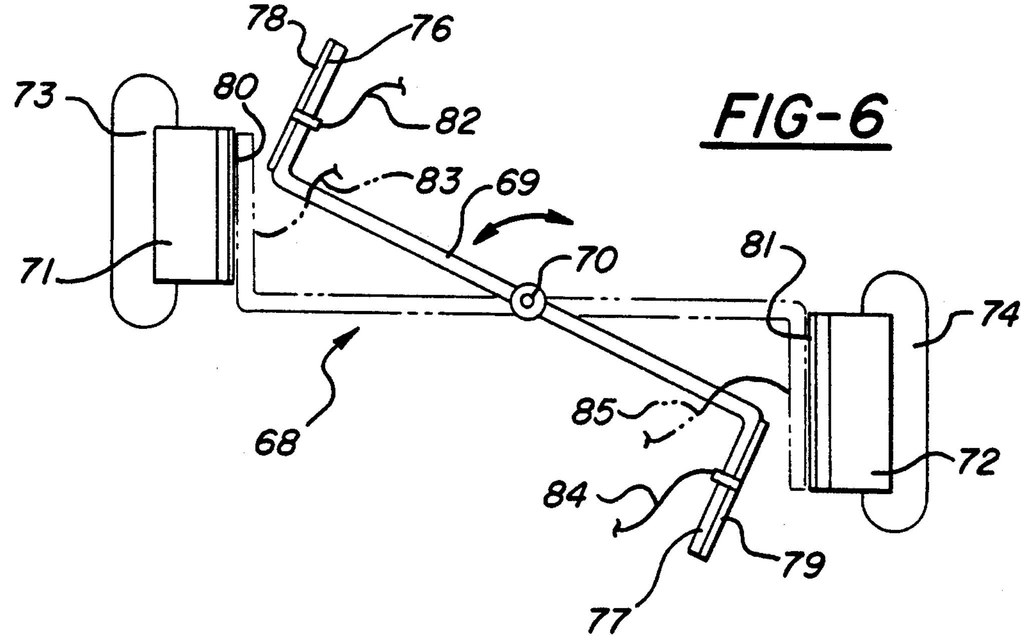
FIG. 6 is a side elevation view of an alternative embodiment of an electromagnetic relay made in accordance with the present invention.

Referring now to FIG. 6, a double relay 68 is provided wherein an arm 69 is mounted on a pivot pin 70. First and second core 71, 72 are provided with first and second coils 73, 74 which are energized to move first and second armature flanges 76, 77 by pivoting the arms 69. Conductive surfaces as shown at 78, 79, 80, 81 are provided on the core 71, 72 and armature flanges 67, 77 by plating or cladding as previously described. Wires 82, 83, 84, 85 are electrically connected to the conductive surfaces 78, 79, 80, 81 to allow the double relay to be included in an electrical circuit.

The above description of various alternative embodiments of the invention are intended to be illustrative and not limiting. The scope of the invention should be construed in light of the following claims.

What is claimed is:

1. An electromagnetic relay (10) comprising:

a non-conductive base (26) for supporting said electromagnetic relay (10);

an electrically conductive core (12) fixedly secured to said non-conductive base (26), said core (12) including a core base (15) and two sidewalls (17,19) extending out from said core base (15) substantially perpendicular thereto;

at least one pole piece (48) fixedly secured to one of said two sidewalls (17,19) and extending out from said sidewall (17,19) substantially parallel to said core base (15), said pole piece (48) including a first terminal (22) to receive a lead (36) from an electrical circuit;

an electrically conducting coil (14) disposed around said core base (15) between said two sidewalls (17,19) to create magnetic flux through said core (12);

an electrically conducting armature (16) including a contacting plate (20) having a predetermined surface area, said armature (16) further including a second terminal (24) to receive a second lead (38) from the electrical circuit said contacting plate (20) being extendable between said two sidewalls (17,19) for receiving the magnetic flux flowing through said core (12) to reduce the amount of magnetic flux required to pivot said armature (16), said electrical relay (10) characterized by pivoting means (28) for pivotally moving said armature (16) such that said contacting plate (20) rotates between an open position spaced apart from said pole piece (48) and a closed position abutting said pole piece (48) such that said contacting plate (20) parallely abuts said pole piece (48) to electrically connect said first (22) and second (24) terminals over said predetermined surface area.

2. An electromagnetic relay (10) as set forth in claim 1 further characterized by said armature (16) including spacing means (27) for spacing said contacting plate (20) laterally from said pivot means (28).

3. An electromagnetic relay (10) as set forth in claim 2 further characterized by said spacing means (27) including an armature support (27) extending out from said contacting plate (20) perpendicularly to said pivoting means (28).

4. An electromagnetic relay (10) as set forth in claim 3 further characterized by a spring (30) extending between said non-conductive base (26) and said contacting plate (20) to bias said contacting plate (20) away from said pole piece (48) and toward said open position.

5. An electromagnetic relay (10) as set forth in claim 3 further characterized by said pivoting means (28) including a fulcrum leg (28).

6. An electromagnetic relay (10) as set forth in claim 5 further characterized by said non-conductive base (26) including a spring position retainer (32) extending out therefrom.

* * * * *